US009830099B1

(12) United States Patent
Johansson et al.

(10) Patent No.: US 9,830,099 B1
(45) Date of Patent: Nov. 28, 2017

(54) SECURE ERASE OF STORAGE DEVICES

(71) Applicant: Amazon Technologies, Inc., Seattle, WA (US)

(72) Inventors: Jesper Mikael Johansson, Redmond, WA (US); Jon Arron McClintock, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 148 days.

(21) Appl. No.: 14/857,705

(22) Filed: Sep. 17, 2015

(51) Int. Cl.
*G06F 3/06* (2006.01)

(52) U.S. Cl.
CPC .......... *G06F 3/0623* (2013.01); *G06F 3/0652* (2013.01); *G06F 3/0679* (2013.01)

(58) Field of Classification Search
CPC ..... G06F 3/0623; G06F 3/0652; G06F 3/0679
See application file for complete search history.

(56) References Cited

U.S. PATENT DOCUMENTS

| | | | |
|---|---|---|---|
| 6,236,586 B1 | 5/2001 | Morisaki | |
| 6,370,603 B1 | 4/2002 | Silverman et al. | |
| 8,521,984 B2 | 8/2013 | Asano et al. | |
| 8,738,935 B1 | 5/2014 | Brooker et al. | |
| 2005/0105055 A1 | 5/2005 | Olson et al. | |
| 2006/0050622 A1* | 3/2006 | So | G06F 3/0619 369/275.1 |
| 2006/0075487 A1* | 4/2006 | Pfleging | G06F 21/88 726/21 |
| 2006/0107071 A1* | 5/2006 | Girish | G06F 11/1433 713/191 |
| 2006/0226950 A1 | 10/2006 | Kanou et al. | |
| 2007/0113029 A1* | 5/2007 | Bennett | G06F 12/0246 711/159 |
| 2007/0129813 A1 | 6/2007 | Ferchau | |
| 2007/0223696 A1 | 9/2007 | Furuyama | |
| 2008/0201544 A1 | 8/2008 | Nakajima et al. | |
| 2008/0263345 A1* | 10/2008 | Booth | G06F 21/572 713/2 |
| 2009/0172639 A1 | 7/2009 | Natu et al. | |
| 2009/0182930 A1 | 7/2009 | Taguchi et al. | |

(Continued)

OTHER PUBLICATIONS

U.S. Appl. No. 13/434,580, filed Mar. 29, 2012, Titled: Verified Hardware-Based Erasure of Data on Distributed Systems.

(Continued)

*Primary Examiner* — Ryan Bertram
(74) *Attorney, Agent, or Firm* — Kilpatrick Townsend & Stockton LLP

(57) ABSTRACT

Techniques for providing secure erase of data stored on a storage device may be provided. For example, a storage device comprising a first layer of firmware that is configured to receive access requests for data stored on a storage device may be in communication with a second layer of firmware. The second layer of firmware may be configured to receive, from the first layer of firmware, a request to erase a portion of the data stored on the storage device and verify the first layer of firmware before processing the erase request. In an embodiment, upon verifying the first layer of firmware, the second layer of firmware may block subsequent read requests for one or more physical blocks of the storage device that correspond to the portion of the data indicated in the erase request.

20 Claims, 7 Drawing Sheets

(56) References Cited

U.S. PATENT DOCUMENTS

| | | |
|---|---|---|
| 2009/0327756 A1* | 12/2009 | Pekowsky ............... G06F 21/10 |
| | | 713/192 |
| 2010/0127856 A1 | 5/2010 | Sipple et al. |
| 2010/0185843 A1 | 7/2010 | Olarig et al. |
| 2010/0281202 A1* | 11/2010 | Abali .................. G06F 12/0246 |
| | | 711/103 |
| 2010/0299555 A1 | 11/2010 | Jepson et al. |
| 2010/0325736 A1 | 12/2010 | Sadovsky et al. |
| 2011/0072209 A1 | 3/2011 | Lund et al. |
| 2011/0218965 A1 | 9/2011 | Lee et al. |
| 2011/0252242 A1 | 10/2011 | Ureche et al. |
| 2011/0258411 A1 | 10/2011 | Sato |
| 2011/0307724 A1 | 12/2011 | Shaw et al. |
| 2012/0278529 A1 | 11/2012 | Hars et al. |
| 2012/0278579 A1* | 11/2012 | Goss .................. G06F 12/0246 |
| | | 711/166 |
| 2013/0160139 A1 | 6/2013 | Goel et al. |
| 2013/0269011 A1 | 10/2013 | Wilson et al. |

OTHER PUBLICATIONS

U.S. Appl. No. 13/928,289, filed Jun. 26, 2013, Titled: Managing Secure Firmware Updates.

U.S. Appl. No. 14/624,480, filed Feb. 17, 2015, Titled: Tamper Detection for Hardware Devices.

U.S. Appl. No. 15/254,581, filed Sep. 1, 2016, Titled: Self-Erasing Portable Storage Devices.

* cited by examiner

SECURE ERASE OF STORAGE DEVICES

BACKGROUND

As computing devices continue to advance in processing power, data access speed, and mobility, so too must associated storage devices advance to maintain the status quo. For example, storage devices have become physically smaller and yet are able to store even more data than predecessor storage technology devices. Further, online marketplaces have allowed a number of consumers to purchase and resell computing devices at competitive prices. However, in some cases, data that is stored on the storage devices of resold or refurbished computing devices may be maintained and accessed by subsequent purchasers.

BRIEF DESCRIPTION OF THE DRAWINGS

Various embodiments in accordance with the present disclosure will be described with reference to the drawings, in which.

DETAILED DESCRIPTION

Figure 1:
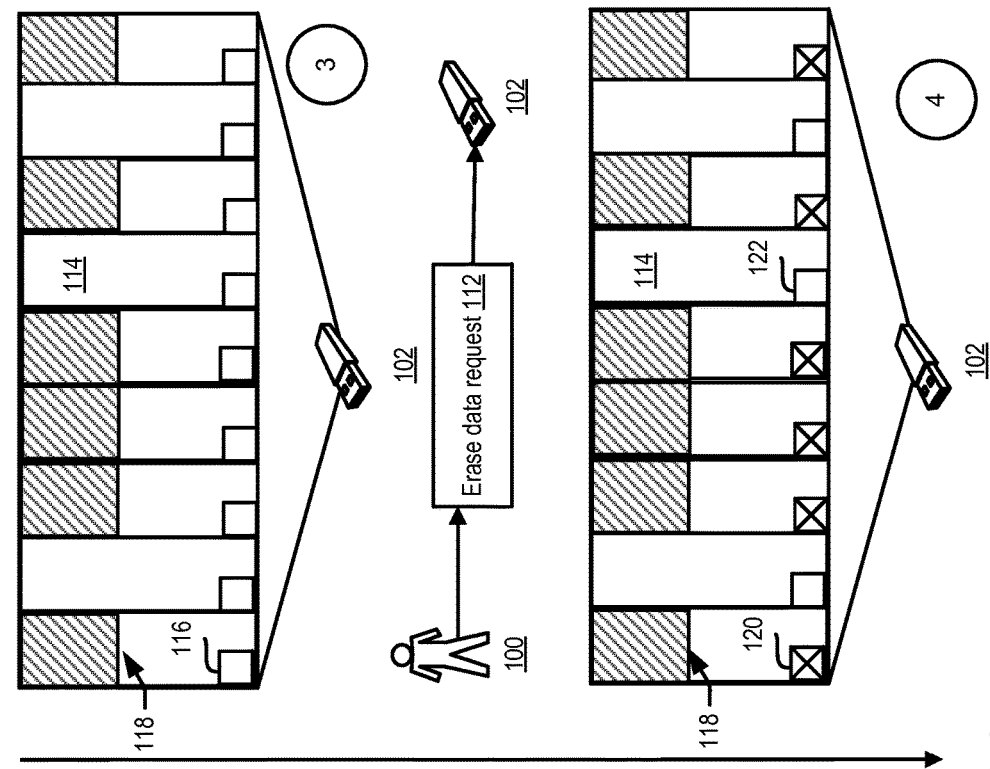
FIG. 1 illustrates an example data flow for a secure erase feature, according to embodiments.
Figure 1:
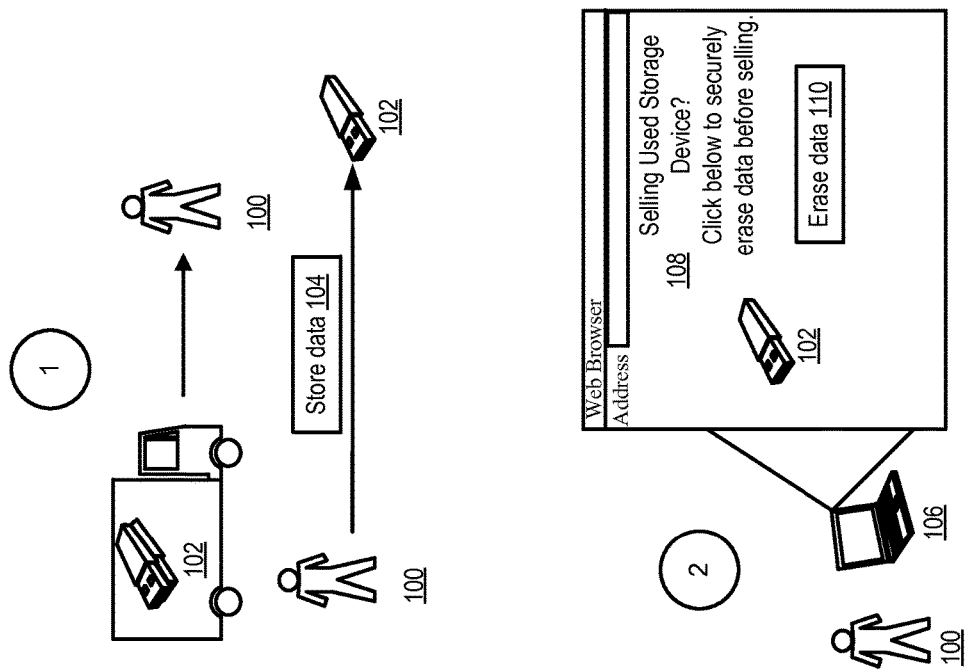

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, providing a secure erase feature for storage devices to securely erase data of the storage devices. In some examples, a storage device (e.g., a flash media device) comprising two layers of firmware may be described for providing a secure erase feature. In accordance with at least one embodiment, the first layer of firmware may be configured to be accessible to users and computing devices for processing data access requests (read or write data requests). The second layer of firmware may be inaccessible to users and computing devices and configured to verify the integrity of the first layer of firmware. For example, each data access request from the first layer of firmware may include a hash value generated by the first layer of firmware and compared to a hash table maintained by the second layer of firmware for verifying the first layer of firmware. Any modifications to the first layer of firmware, such as updating the firmware, will result in a hash value that is not included in the hash table thus resulting in an unverified request that will not be processed by the second layer of firmware. In an embodiment, the second layer of firmware may be configured to maintain a flag or other indicator for each data block of an associated storage device that indicates whether the data block may be accessed in response to a read request.

The second layer of firmware can set the flag or modify the indicator for data blocks that correspond to an erase request thereby blocking or denying subsequent read requests for the data blocks in question. The second layer of firmware may maintain instructions that prevent read requests from an entity requesting data for one or more blocks that have a corresponding flag set or indicator modified. A read request for the blocks of the storage device that correspond to a successful erase request by the second layer of firmware would indicate that no data is written to the data blocks and therefore the storage device lacks any data to read. However, as can be inferred from the description herein, the data present on the one or more data blocks before execution of the erase request may still exist on the storage device but are inaccessible by a requesting entity. The second layer of firmware includes instructions to provide an error or indication that no data is written to such blocks because the flag has been set or indicator modified for the blocks. In accordance with at least one embodiment, the first layer of firmware may modify the flags or indicators associated with an erase data request in response to the first layer of firmware being verified by the second layer of firmware. In embodiments, the one or more data blocks that correspond to the erase request are configured to receive data associated with a write request and will respond to a subsequent read request with the data stored on the device after a write request has been processed by the storage device for the one or more data blocks. However, the data provided in response to the subsequent read request will consist of the data that was recently written and not the data that was blocked by the secure erase feature in response to the erase request.

In a non-limiting example, a user may order or possess a digital camera that utilizes a flash media storage device that comprises two layers of firmware configured to implement the secure erase feature described herein. The user may store pictures of their family on the flash media storage device. At a later time, when the user wishes to resell the digital camera and the associated flash media storage device on an online marketplace, the user may utilize functions on the digital camera to erase or wipe clean the storage device. In response to the request to securely erase the data of the device, the first layer firmware may receive the request, calculate a hash value based on the version of the first layer of firmware, and provide both the hash value and erase request to the second layer of firmware. The second layer of firmware can verify the first layer of firmware by comparing the generated hash value to a hash lookup table and begin processing the erase request. In an embodiment, the second layer of firmware may set a flag associated with each data block of the flash media storage device, where the flag indicates that no data is written to each data block in response to a read request. In embodiments, the hash value may be generated by the second layer of firmware by reading the data of the first layer of firmware and comparing the resultant hash value to a hash value storage or cache that corresponds to a correct or verified hash value. Upon completion of setting the flag for each data block, the second layer of firmware may provide a notification to the user, via the first layer of firmware, that indicates that all data blocks of the flash media storage device are erased even though the data may still be present or otherwise indexed. Thereafter, the user may resell the digital camera and associated flash media storage device with assurance that none of the pictures stored on the drive can be accessed by subsequent read requests from subsequent purchasers or users of the digital camera.

In accordance with at least one embodiment, a service implementing the secure erase feature may provide an update to existing firmware for flash media storage devices that do not include two layers of firmware (such as devices that have one layer of firmware). The updated firmware for the device would perform similarly as the two layer firmware embodiment in terms of including instructions for setting a flag or modifying an indicator that blocks subsequent read requests. However, because the storage device lacks two firmware layers a verification of requests from the first layer of firmware cannot be performed. Instead, the updated firmware would verify the integrity of the firmware to identify if any further updates or changes have been made to the firmware. In an embodiment, in response to identifying that a further update or modification has occurred to the firmware, an "erase all" feature may be invoked for all data blocks of the flash media storage device. The "erase all" feature may set flags for all data blocks of the storage device thus ensuring security of the data and blocking subsequent read data requests but allowing subsequent write requests. The described embodiments of the secure erase feature help secure data and ensure privacy of users who store data on storage devices that implement the secure erase feature by blocking read requests for blocks of data that correspond to a verified erase request. Further, as the integrity of a flash media storage device is limited by a finite number of write requests, the secure erase features described herein help maintain a high mean time to failure (MTTF) for the drives, as flags or indicators can be modified that block access as opposed to erase requests which negatively affect the MTTF for a flash media storage device. Flash media storage devices, such as solid state drives, perform block address translation during write and read operations. Thus, while an operating system interacting with the storage device selects a particular address to write data, the firmware of the flash media storage device may write the data into the leased used memory location using logical block addressing (LBA) to maintain a high MTTF. Flash media storage devices may perform write leveling to ensure a high MTTF and thus unwritten blocks of the storage device are not static as the physical address of any unwritten block can change because of the write leveling. Flash media storage devices described herein including solid state drives or solid state media include non-volatile, non-magnetic storage devices or non-magnetic media that utilizes write leveling. Further, flash media storage devices and/or solid state media includes at least one of a secure digital flash storage device, a universal serial bus flash storage device, a solid state storage drive, or a storage device/media that does not utilize the serial advanced technology attachment (SATA) protocol. It should be appreciated that storage devices/media that utilize SATA protocols have access to an erase functionality that erases all data on a device despite the data being stored in a host protected area, or in a defective area known to the logical block addressing mechanism of the drive itself. The erase functionality for SATA protocol storage drives/media writes zeroes or ones to every data block including blocks that are in a host protected area and defective blocks. SATA protocols as used herein refer to multiple versions of the SATA protocol including SATA revision 1.0, 2.0, 3.0, 3.1, 3.2, and eSATA.

This brief introduction is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many. For example, the second layer of firmware may read one or more bits from the first layer of firmware to verify the data access request.

FIG. 1 illustrates an example data flow for a secure erase feature, according to embodiments. The data flow of FIG. 1 at step 1 includes a user 100 receiving and utilizing a flash media storage device 102. In an embodiment, secure erase service computers may generate and provide instructions to deliver the flash media storage device 102 that implements the secure erase feature described herein to the user 100. The deliver instructions may be provided over one or more networks to a retailer or fulfillment center associated with the secure erase service computers to fulfill the order by the user 100. The user 100 may then enjoy and utilize the flash media storage device 102 by storing data 104 such as pictures, movies, and any other suitable files on the flash media storage device 102. In an embodiment, the data flow of FIG. 1 at step 2 includes the user 100 utilizing a user device, such as a laptop 106, to interact with a network document 108 provided by a web browser to sell the flash media storage device 102.

In an embodiment, at some time point after the flash media storage device 102 is sold but before the device has left the user 100, the user 100 may interact with the flash media storage device 102 to submit an erase data request for the data stored thereon. For example, the user 100 may interact with the laptop 106 to provide an operating system call to erase the data stored on the flash media storage device 102. In an embodiment, a secure erase service associated with the network document 108 may provide a user interface element 110 (such as a button or link) that enables the user to authorize the submission of a secure erase request on behalf of the user 100 by the service. In an embodiment, the secure erase service may invoke an operating system function or application program interface call to submit a secure erase request on behalf of the user. In accordance with at least one embodiment, the data flow of FIG. 1 at step 3 illustrates the state of the flash media storage device 102 before the erase request 112 is submitted by the user 100. The illustration of the state of the flash media storage device 102 includes one or more data blocks 114 each with a corresponding flag or indicator 116 with striated portions 118 representing data blocks that are currently storing data from the user 100. The data flow of FIG. 1 at step 4 illustrates the state of the flash media storage device 102 after executing the erase request 112 from the user 100.

The illustration of the state of the flash media storage device 102 includes the one or more data blocks 114, striated portions 118 representing the data blocks 114 containing the data, and updated flags or modified indicators 120 in response to instructions from the second layer of firmware from the flash media storage device 102. The state of the flash media storage device 102 at step 4 includes unmodified flags or indicators 122 that represents portions of the device 102 that did not require any modification as no data was originally stored thereon. As is illustrated in FIG. 1, and described herein, although the state of the flash media storage device 102 represents the data blocks 114 containing data 118 the flags 116 for data containing portions 120 have been set. As such, subsequent read requests for those portions of data are blocked as the second layer of firmware for the flash media storage device 102 are configured to block or deny read requests for data blocks whose flags are set in response to a verified erase request. In an example, the user can thereafter resell the flash media storage device 102 without feeling insecure about subsequent users/buyers being able to access his data, pictures, or files stored on the flash media storage device 102. The data blocks 114 include striated portions 118 to represent data blocks 114 that contain data. However, embodiments described herein include scenarios where a portion of a data block 114 stores data or where the entire data block 114 is storing data. In embodiments where a portion of data block 114 is utilized to store data, multiple flags or indicators may be utilized for each data block 114 to indicate which portion should be blocked or denied in response to subsequent read request until that particular portion of data block 114 is written with new data. In embodiments where the entire data block 114 is utilized to store data, either from a write request that utilizes the entire block or in response to a partial write request where the rest of the portion of the data block is written with null data, the corresponding flag 116 or indicator may be appropriate as described herein for setting and denying subsequent read requests in response to an erase request. In accordance with at least one embodiment, the second layer of firmware for the flash media storage device 102 may maintain the appropriate stage for each flag or indicator in a multiple to one flag-data block embodiment or a one to one flag-data block embodiment. It should be appreciated that although FIG. 1 illustrates flags being set for a particular block being utilized to determine whether a read request should be denied, in implementations and embodiments the absence of a flag being set can indicate that a read request should be denied. For example, FIG. 1 illustrates that flags being set in response to a verified erase request and denying subsequent read requests for blocks whose associated flag is set, in some examples, a verified erase request may update or modify a flag from being set to being empty which can result in a subsequent read request being denied for blocks of data whose flags are unmodified or not set.

Figure 2:
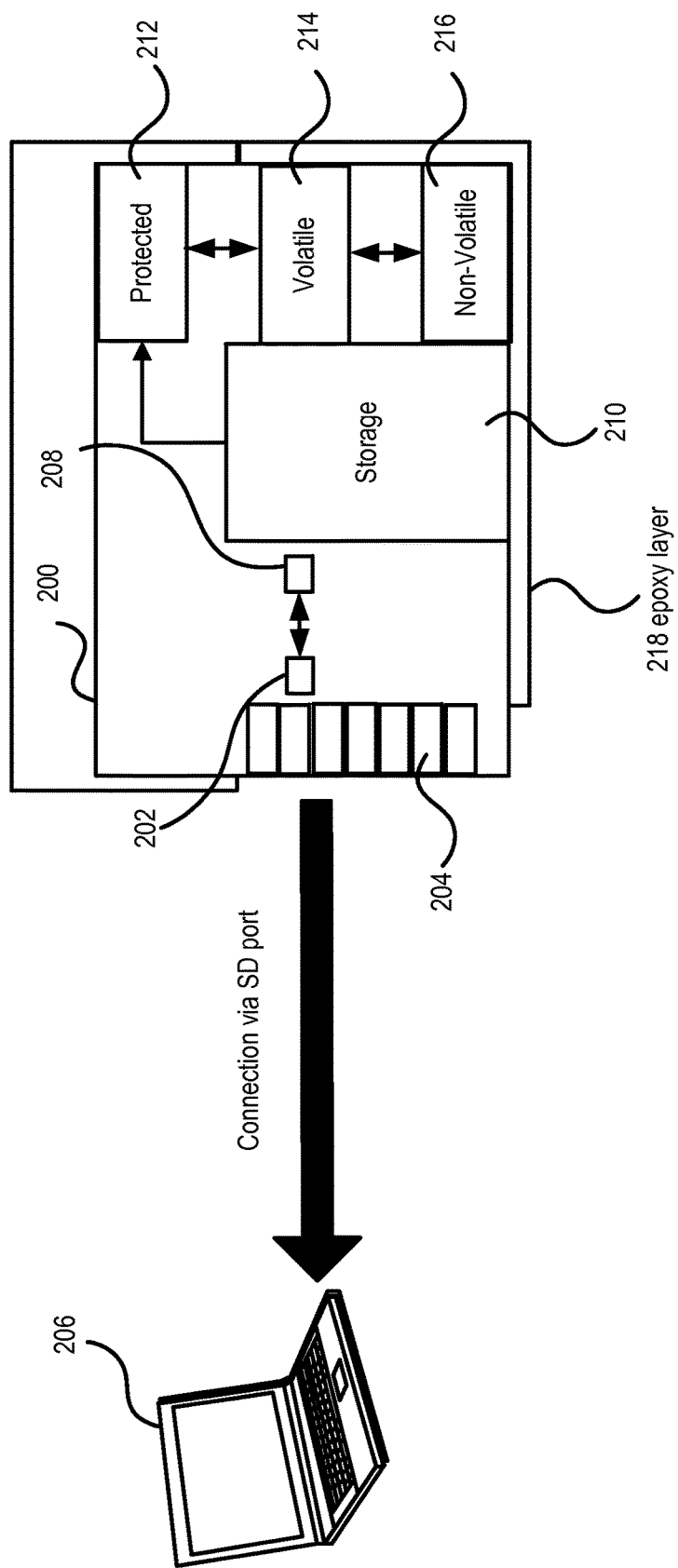
FIG. 2 illustrates an example configuration for a secure digital (SD) flash storage device that can be used in a secure erase feature embodiment.

FIG. 2 illustrates an example configuration for a secure digital (SD) flash storage device that can be used in a secure erase feature embodiment. The illustrative example of FIG. 2 includes an SD storage device 200 for receiving and processing data storage access requests including read and write operations. In some examples, the SD storage device 200 may be configured with a first layer of firmware 202 accessible by one or more pins 204 for receiving read and write data requests. The one or more pins 204 may be configured to interact with a user device 206 via an SD port. A user may interact with the user device 206 to request data to be stored or removed from the SD storage device 200. The SD storage device 200 may further be configured with a second layer of firmware 208, a storage area 210 for storing data, a protected area 212, and volatile 214 and non-volatile 216 memory portions. The protected area 212 may include one or more data blocks of the SD storage device 200 that are reserved for storing commands or operations associated with the first layer of firmware 202 and second layer of firmware 208. The protected area 212 may be created by instructions from the firmware that indicate that storage requests ignore data blocks that correspond to the protected area 212. In embodiments, the volatile 214 and non-volatile 216 memory portions of the SD storage device 200 may include logic gate NAND or NOR memory instead of metal platters with magnetic coating and read/write heads that are found in non-flash media storage devices. In an embodiment, the SD storage device 200 may be encased in an epoxy layer 218 to prevent physical access to the components 202 and 208-216. In an embodiment, the encasing of the SD storage device 200 in the epoxy layer 218 may prevent tampering or accessing the components of the SD storage device 200 by sheering or destroying components of the device upon an attempt to open, crack, or otherwise access the mechanical components that comprise the SD storage device 200. In embodiments, the epoxy layer 218 encapsulates the SD storage device while still leaving the one or more pins 204 accessible and capable of being interfaced with by, for example, the user device 206. In an embodiment, the protected area 212 may maintain a mapping of logical data blocks to physical flash pages for interacting with a sector-based file system that user devices, such as user device 206, may utilize to access data files such as images, videos, or text files. In embodiments, instructions provided by the second layer of firmware 208 may be performed in the protected area 212. For example, the protected area 212 may be configured to maintain one or more flags or indicators that correspond to each data block of the storage area 210 for use in the secure erase features described herein. In an example, the SD storage device 200 may include one or more processors and/or controllers as well as additional volatile memory for executing the secure erase features described herein.

As described herein, a data access request including read, write, move, or erase request, may be provided to the SD storage device 200 via the user device 206 and the first layer of firmware 202. In embodiments, the first layer of firmware 202 may be configured to generate a hash value and provide the data access request and the hash value to the second layer of firmware 208. In accordance with at least one embodiment, the first layer of firmware 202 may take the data access request and utilize a salt, derived from the version of the first layer of firmware 202, to generate a hash value that is later verified to process the data access request. In some embodiments, the data included in the data access request is hashed using a cryptographic hash function using the version of the first layer of firmware 202, or information and/or metadata associated with the first layer of firmware 202 or the second layer of firmware 208. In some embodiments, a hash value is generated using the data included in the data access request and information and/or metadata associated with the first layer of firmware 202 or the second layer of firmware 208 that is provided with the data access request for verification. The second layer of firmware 208 may be configured to verify the first layer of firmware 202 and perform the data access request upon verifying the first layer of firmware 202. Once a data access request, such as a write request, is verified, the data may be stored in the storage area 210 of the SD storage device. In an embodiment, the non-volatile memory portion 216 may be configured to store a hash value table for use in verifying the hash value provided by the first layer of firmware 202. In an embodiment, the hash value table may be stored in the protected area 212. The volatile memory portion 214 may be configured to store instructions for use in accessing data stored in the storage area 210. In an embodiment, updates to the first layer of firmware 202 may be provided to the SD storage device 200 which may update the hash value table maintained in the non-volatile memory 216. In embodiments, the first layer of firmware 202 may be configured to receive firmware updates but the second layer of firmware 208 may not be configured to receive and execute firmware updates. As such, the functionality of setting flags or modifying indicators for data blocks that correspond to verified erase requests cannot be modified by a firmware update to the second layer of firmware 208 thus ensuring privacy and secure erase of files stored in the storage area 210. It should be noted that although the SD storage device 200 illustrated in FIG. 2 includes components 202-218, embodiments described herein can include media drives, storage media, flash drives, SD storage devices, and other suitable media with fewer or more components than those illustrated in FIG. 2. Arrows illustrated in FIG. 2 represent, in at least one embodiment, the data flows between components 202, 208, 210, and 212-216. However, one or more combinations, additions, or modifications, are also capable of being incorporated in embodiments described herein for the data flow of data in a flash media storage drive.

In accordance with at least one embodiment, upon receiving and verifying an erase data request for erasing a portion of the data or all of the data stored in the storage area 210, the second layer of firmware 208 may be configured to set a flag or modify an indicator maintained in the protected area 212. The second layer of firmware 208 may further be configured to determine whether a read request can be fulfilled based at least in part on identifying whether the data blocks that correspond to the read request have a flag that is set or an indicator modified. For example, upon the second layer of firmware 208 verifying an erase data request for a particular file stored in storage area 210, the corresponding flags maintained in the protected area 212 may be set. The second layer of firmware 208 may be configured to indicate or return an error that no data is written in response to a subsequent read request for the data file or portions of data blocks that have a flag set. In an embodiment, the non-volatile memory portion 216 may be configured to store software for operating the flash media storage device 200 and identification information of the flash media storage device 200.

The indication that data is not written to particular portions of the storage area 210 may be provided to the first layer of firmware 202 and further provided to the requesting entity such as a user interacting with the user device 206. In embodiments, the second layer of firmware 208 may be configured to execute a verified write request, provided by the first layer of firmware 202, to data blocks that have a flag that is set or an indicator modified. The second layer of firmware 208 may be configured to write the data included in the write request to corresponding data blocks in the storage area 210 and to unset the flag or further modify the indicator that prevents read operations. In embodiments, the second layer of firmware 208 may include instructions to write dummy data, such as zeros, to the data block depending on the size of the data block in the storage area 210 and the size of the data included in the write request. This is to prevent granting access to the data that was previously inaccessible as a write request would unset the flag or modify the indicator for the entire data block. As such, as the new data is written to previously inaccessible areas of the storage area 210, the non-volatile memory 216 may include instructions to determine whether dummy data is needed to prevent access to previously inaccessible data upon modifying the indicator or unsetting the flag for data blocks that correspond to a previous erase request. In embodiments, the second layer of firmware 208 may be configured to execute an erase all feature for all the data stored on in the storage area 210 upon identifying that a data access request is unverified. An unverified data access request may occur when the first layer of firmware 202 is modified, usually in response to being tampered with by malicious entities attempting to gain access to the data stored in the storage area 210. An erase all feature would entail the second layer of firmware 208 instructing that all flags or all indicators be modified for the data blocks that correspond to the storage area 210.

Figure 3:
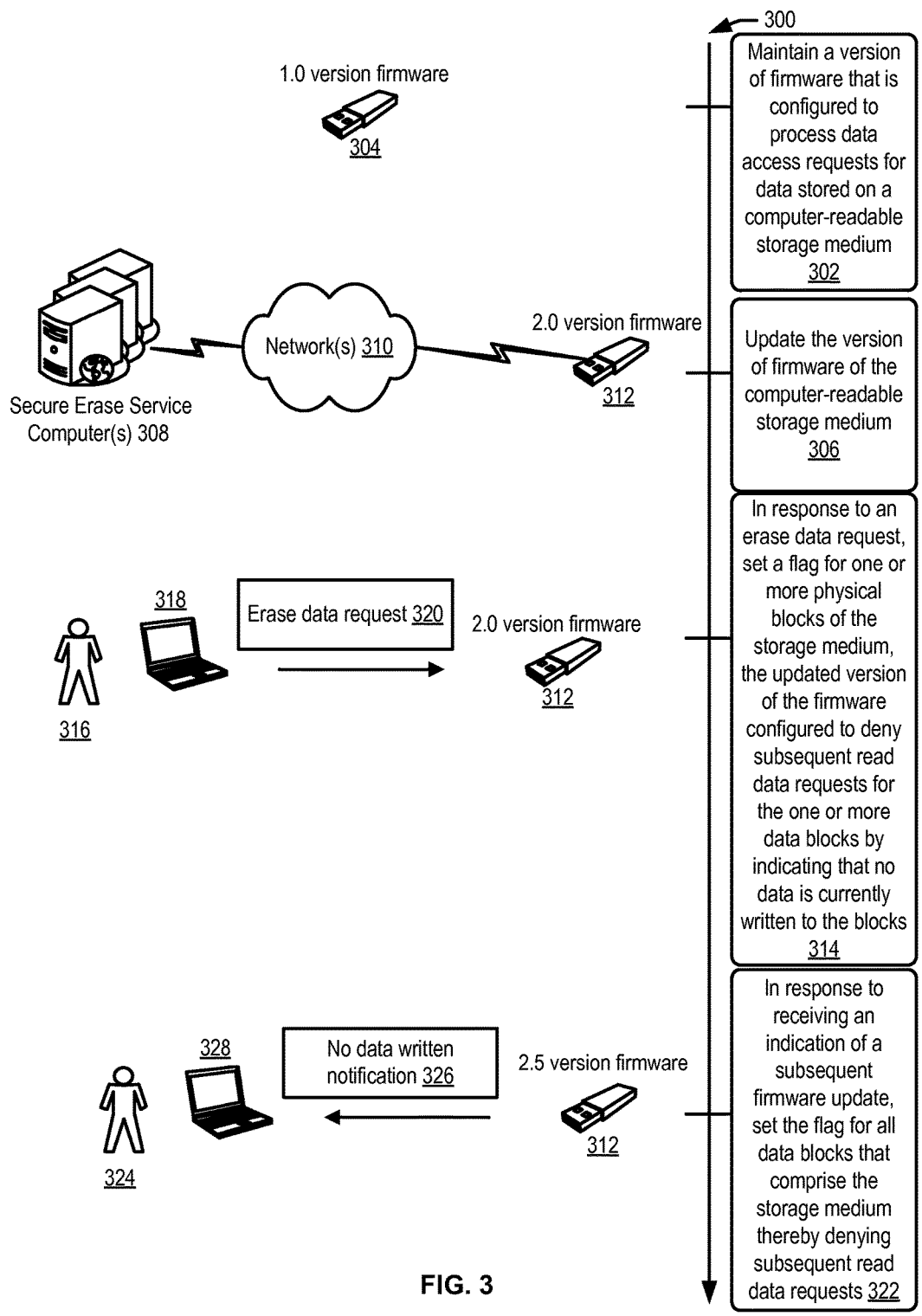
FIG. 3 illustrates an example data flow for a secure erase feature, according to embodiments.

FIG. 3 illustrates an example data flow for a secure erase feature, according to embodiments. The example data flow 300 illustrated in FIG. 3 includes one or more operations. However, the order in which the operations are described is not intended to be construed as a limitation, and any number of the described operations can be combined in any order and/or in parallel to implement the described flow. The flow 300 may include maintaining a version of firmware that is configured to process data access requests for data stored on a computer-readable storage medium at 302. For example, a flash media storage device 304 may be configured to utilize a 1.0 version firmware for executing data access requests for data stored on the flash media storage device 304. The flow 300 may include updating the version of firmware of the computer-readable storage medium at 306. In an embodiment, one or more secure erase service computers 308 that implement the secure erase features described herein may provide a firmware update, via one or more networks 310. It should be noted that the flash media storage device 304 is configured to utilize one layer of firmware.

The flash media storage device 304 upon updating the firmware may be designated as 2.0 version firmware 312. In embodiments, update to firmware for flash media storage devices or computer-readable storage medium can be performed by providing the firmware update to a computing device that the storage devices are connected to. In some examples, updating the firmware can be accomplished by executing the update directly on the storage devices that are configured to utilize network technology such as wireless or wired networks accessible by network cards. In an embodiment, the firmware for the flash media storage device 312 may be updated by flashing or erasing the previous exiting firmware and replacing it with the updated version of firmware. The flow 300 may include, in response to an erase data request, setting a flag for one or more physical blocks of the storage medium where the updated version of the firmware is configured to deny subsequent read data requests for the one or more data blocks with corresponding flags that are set at 314.

In an example, the 2.0 version firmware flash media storage device 312 may be configured to indicate that no data is currently written to the data blocks that have corresponding flags set. In an embodiment, a user 316 may interact with a computing device 318 to provide an erase data request 320 to the flash media storage device 312. The updated firmware (2.0 version firmware) may be configured to update flags or modify indicators associated with each data block that corresponds to the erase data request 320. The updated firmware (2.0 version firmware) may be configured to return an indication that no data is written to the data blocks in response to subsequent read requests for one or more data blocks whose flags or indicators indicate that the file was successfully erased (by being set or modified). However, the data exists on the flash media drive 312 it is merely blocked from being read by the instructions provided by the updated firmware executing on the flash media drive 312.

The flow 300 may include, in response to receiving an indication of a subsequent firmware update, setting the flag for all data blocks that comprise the computer readable storage medium there by denying subsequent read data requests at 322. In an example, a malicious entity, such as user 324, may attempt to access the data stored in the flash media storage device 312 by attempting to update the firmware (2.5 version firmware). The version 2.0 firmware of the flash media storage device 312 may receive the indication that the firmware is attempting to further update and in response set the flag for the data blocks that comprise the storage area of device 312. Thereafter, the user 324 may receive a no data written notification 326 via a computing device 328 in response to submitting a read data request to the flash media storage device 312. The user 324 may submit write data requests to the flash media storage device 312 which may be executed by the device but any attempt to read data that have corresponding flags set will be denied and instead indicate that no data is written to the device. The 2.0 version firmware that implements features described herein may be configured to zero out or append dummy data to subsequent write requests to prevent the unnecessary unsetting of flags as a work around to read data that was previously indicated as unavailable. As described in FIG. 3, the secure erase features described herein are capable of performing the functionality of the two layer firmware with only one layer of firmware on a device that sets the flags or modifies the indicators associated with data blocks that are erased. In an embodiment, the layer of firmware may maintain a mapping of logical blocks to physical blocks and the status of written flags if written flag has never been written to, or erased, refuse the read.

Figure 4:
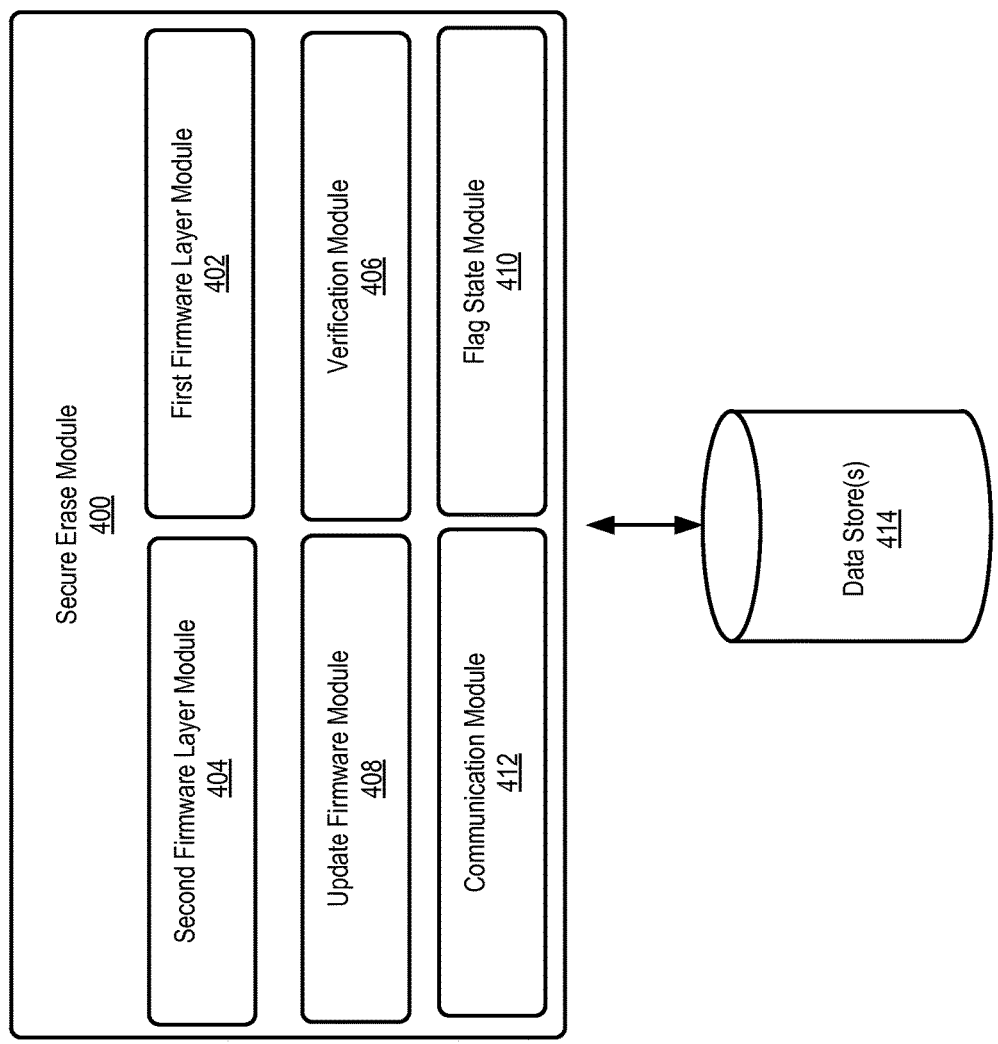
FIG. 4 illustrates an example secure erase module, according to embodiments.

FIG. 4 illustrates an example secure erase module, according to embodiments. In accordance with at least one embodiment, the secure erase module 400 may include a first firmware layer module 402, a second firmware layer module 404, a verification module 406, an update firmware module 408, a flag state module 410, and a communication module 412 in communication with a data store 414. The modules included within and including the secure erase module 400 may be software modules, hardware modules or a suitable combination thereof. If the modules are software modules, the modules can be embodied on a non-transitory computer readable medium and processed by a processor in any of the computer systems described herein. It should be noted that the described processes and architectures described below can be performed either in real-time or in an asynchronous mode prior to any user interaction. The modules may be configured in the manner suggest in FIG. 4 or may exist as separate modules.

In accordance with at least one embodiment, the first firmware layer module 402 may be configured to interact with the first layer of firmware of a flash media storage device to receive data access requests from users, users interacting with computing devices, or directly from other computing devices such as third party computers over one or more networks. The first firmware layer module 402 may be user facing and respond to application program interface calls from a computing device requesting access to data stored on a flash media storage device. In an embodiment, the first firmware layer module 402 may be configured to generate a hash value that may be provided to the second firmware layer module 404 for verification purposes. The hash value may be generated based at least in part on the version of the firmware associated with the first firmware layer module 402 or generated based at least in part on several bits of the firmware version. The first firmware layer module 402 and the communication module 412 may be configured to provide the data requested in a data access request when the request is verified or a notification indicating that no data is written when the request is not verified. In an embodiment, the first firmware layer module 402 may be configured to obtain hardware characteristics of a computing device that the flash media storage device is connected to and generate an encryption key based on the hardware characteristics. The encryption key may be stored in a protected area of the flash media storage device or stored in volatile memory where it will be lost upon the loss of power to the flash media storage device.

In accordance with at least one embodiment, the second firmware layer module 404 may be configured to interact with the second layer of firmware of the flash media storage device to verify a first layer of firmware and execute any data access requests that are verified. In an embodiment, the second firmware layer module 404 may be configured to interact with a protected area of a flash media storage device to set a flag or modify an indicator that is maintained for each data block of the flash media storage device. Setting of the flags or modifying of the indicators for data blocks indicates that the second firmware layer of the flash media storage device is incapable of responding to a read request for data blocks whose flags are set and instead indicating that no data is written to such data blocks.

The second firmware layer module 404 may be configured to further modify an indicator or remove the setting of a flag in response to executing a verified write request to data blocks that previously had set flags or modified indicators. In embodiments, the second firmware layer module 404 is configured to append dummy data, which may be stored in the volatile or non-volatile memory portions of the flash media storage device, to verified write requests when the size of the data being written is smaller than the size of the data block being written to. Determining an inconsistency in size and therefore a potential leak in access to data that was previously indicated as inaccessible can be performed by the secure erase module 400. In an embodiment, the secure erase module 400 may maintain how much data from a particular block can be read after an erase request is performed by the second layer of firmware of the flash media storage device. Further, when writing data to data blocks, the secure erase module 400 may provide instructions to append the dummy data or zeroes to the data being written to particular data blocks to prevent unnecessary access to previously inaccessible data.

In accordance with at least one embodiment, the verification module 406 may be configured to maintain a hash value table of hash values that indicate that a first layer of firmware is verified. In an embodiment, the verification module 406 may be configured to verify the first layer of firmware of a flash media storage device by reading or identifying particular bits of the version of the first layer of firmware that the device is currently executing. When the firmware layers are first created the verification module 406 may maintain the corresponding values for the bits that should exist without modification to the first layer of firmware of the flash media storage device. Any inconsistency between the values can be interpreted by the verification module 406 as an unverified first layer of firmware.

In embodiments, the verification module 406 may be configured to analyze global positioning system (GPS) information to determine if the associated flash media storage device is being removed from a previously created geo-fence. For example, the verification module 406 may maintain several coordinates in a protected area of the flash media storage device that indicate a geo-fence that the device may be verified and function within and determined to be unverified and fail to function when outside of the geo-fence. In an embodiment, a user may set up the geo-fence to associate with a particular flash media storage device upon purchase. For example, the user may interact with a registration or set-up web page to provide geographic location information (such as an address or longitude and latitude information), or GPS information. A service that implements the secure erase feature may provide the registration/set-up web page and associate the geographic location information with an ordered flash media storage device to aid in performing the geo-fence functionality described herein. In some examples, the flash media storage device may be configured to interact with one computer device and provides an erase all signal to the second layer of firmware when the device is removed from the computing device. For example, the flash media storage device may be configured to store a certain amount of residual power upon being disconnected from the computing device in order to provide the erase all feature or function call to the second layer of firmware or second firmware layer module 404. The verification module 406 may maintain encryption keys generated from hardware characteristics of an associated computing device as described above indefinitely and may detect an inconsistency in response to an encryption key that is generated from updated or changed hardware in the associated computing device.

In accordance with at least one embodiment, the update firmware module 408 may be configured to execute a one-time update to the firmware of a flash media storage device that is associated with one layer of firmware rather than two levels of firmware. In an embodiment, the update firmware module 408 may identify any changes or potential updates to the one-time update and provide a signal to the firmware of the flash media storage device to execute an erase all function that would set flags or modify indicators of all data blocks of the associated flash media storage device. The execution of the erase all feature would provide security and indicate privacy of any previously stored data by preventing any subsequent read requests of the data stored on the flash media storage device because the firmware is configured to indicate that no data is written for data blocks whose associated flags are set or indicators are modified. In an embodiment, the flags or indicators may be maintained and updated in an allocation table associated with the flash media storage device. In embodiments, computation of free space on the flash media storage device may take into account the flag setting or indicator setting associated with each data block and/or physical block of storage on the flash media storage device. In accordance with at least one embodiment, the flag state module 410 may maintain the state of flags or modification of indicators for each data block that comprise the storage area of the flash media storage device. In an embodiment, the communication module 412 may be configured to generate and provide a notification to the first firmware layer module 402 or directly to an operating system/computing device indicating that no data is written in response to read request for data blocks whose flags are set or indicators modified.

Figure 5:
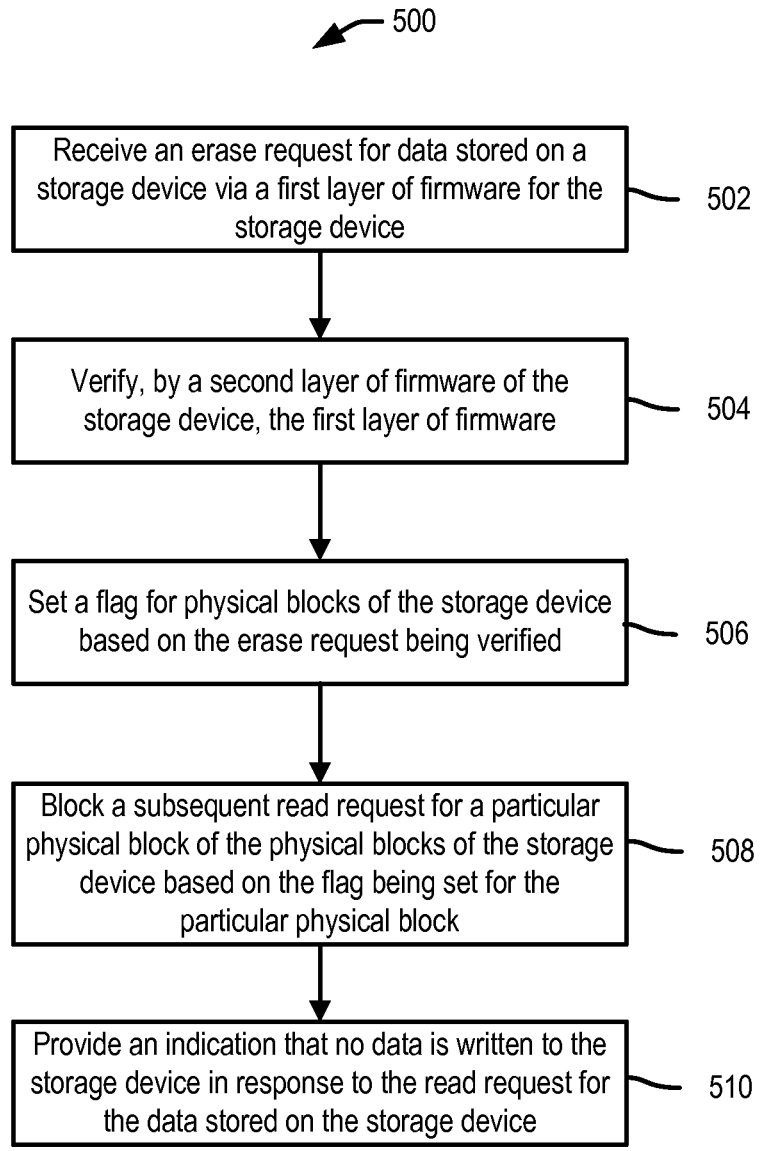
FIG. 5 illustrates an example flow diagram for a secure erase feature, according to embodiments.
Figure 6:
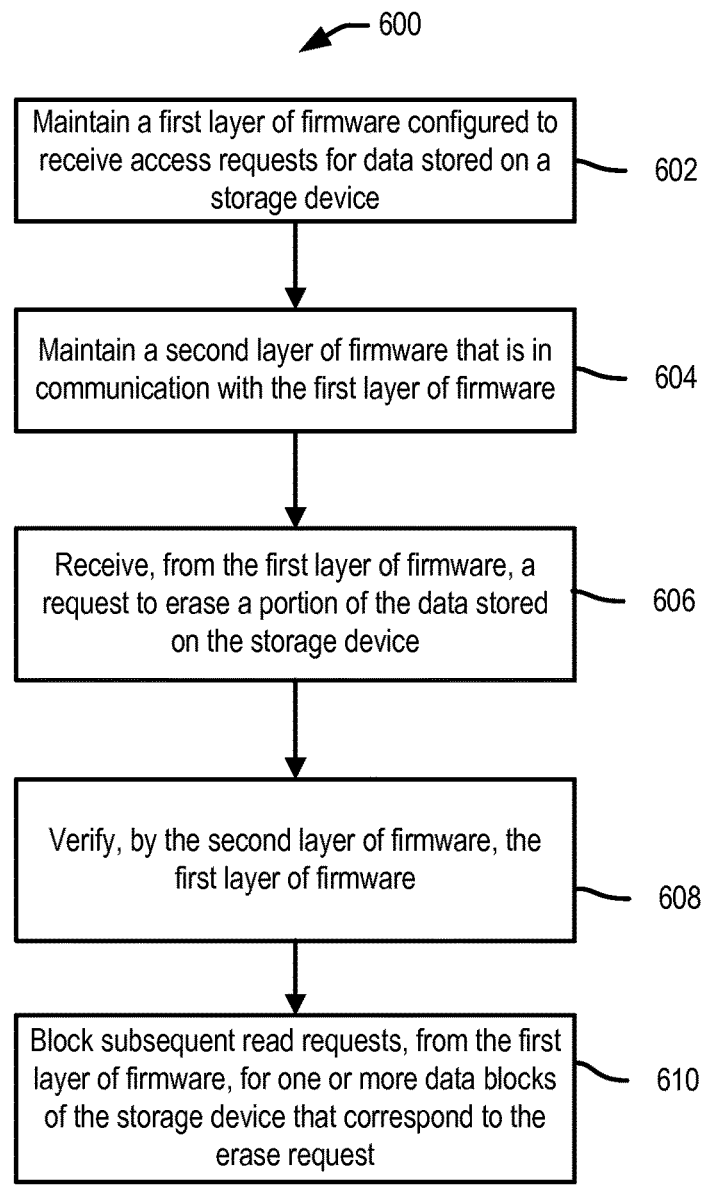
FIG. 6 illustrates an example flow diagram for a secure erase feature, according to embodiments.

FIGS. 5 and 6 illustrate example flow diagrams for a secure erase feature, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processor, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the process (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. As noted below, the code may be stored on a computer-readable storage medium, for example, in the form of a computer program including a plurality of instructions executable by one or more processors. The computer-readable storage medium may be non-transitory.

In some examples, one or more secure erase service computers (e.g., utilizing at least one of a secure erase module 400, a first firmware layer module 402, a second firmware layer module 404, a verification module 406, an update firmware module 408, a flag set module 410, and a communication module 412 in communication with one or more data stores 414) shown in FIG. 4 may perform the processes 500 and 600 of FIGS. 5 and 6. In FIG. 5, the process 500 may include receiving an erase request for data stored on a storage device via a first layer of firmware for the storage device at 502. The erase request may be to erase a portion of data on the storage device or to erase all of the data stored on the storage device. The process 500 may include verifying, by a second layer of firmware of the storage device, the first layer of firmware of the storage device at 504. In accordance with at least one embodiment, verifying the first layer of firmware is based at least in part on a comparison between a hash value generated from the erase request and provided by the first layer of firmware and a hash value cache that is maintained by the second layer of firmware or in a protected area of the storage device.

The process 500 may include setting a flag for physical blocks of the storage device based on the erase request being verified at 506. As described herein, the second layer of firmware may be configured to execute the setting of a flag or modifying of an indicator for one or more data blocks of the storage device that correspond to the erase request. The second layer of firmware may be configured to indicate to a requesting entity that the data blocks are not written to and thus have no data to read for any data blocks that have set flags or modified indicators. The process 500 may include blocking a subsequent read request for a particular physical block of the physical blocks of the storage device based on the flag being set for the particular physical block at 508. The process 500 may conclude at 510 by providing an indication that no data is written to the storage device in response to the read request for the data stored on the storage device. Thus, although the data that corresponds to the verified erase request still exists on the storage device it is inaccessible to a requesting entity as long as the flag is set and the flag is not modified until a write request for the particular data blocks has been executed.

In accordance with at least one embodiment, the process 600 may include maintaining a first layer of firmware configured to receive access requests for data stored on a storage device at 602. In an embodiment, the access requests can include a read data request, a write data request, a move data request, or an erase data request. The process 600 may include maintaining a second layer of firmware that is in communication with the first layer of firmware at 604. In embodiments, the first layer of firmware may be user accessible via a computing device or an operating system request. However, the second layer of firmware is inaccessible to users or devices directly and all data requests should go through the first layer of firmware. The process 600 may include receiving, from the first layer of firmware, a request to erase a portion of the data stored on the storage device at 606. The process 600 may include verifying, by the second layer of firmware, the first layer of firmware at 608. In accordance with at least one embodiment, the first layer of firmware may be verified based at least in part on an encryption key that is derived from information associated with the first layer of firmware. In an embodiment, the first layer of firmware may be configured to generate the encryption key and provide it and the data access request to the second layer of firmware for verification. The process 600 may conclude at 610 by blocking subsequent read requests from the first layer of firmware for one or more data blocks of the storage device that correspond to the erase request. In an embodiment, the second layer of firmware may be configured to block the subsequent read requests by identifying that a flag or indicator has been set/modified for the data blocks that correspond to the read request and indicate that no data is written for the identified blocks. In accordance with at least one embodiment, the second layer of firmware may make a determination of whether to set or update a flag/indicator for blocks of data that are erased and denying subsequent read requests for blocks whose associated flags are set, or to set flags/indicators for all other blocks allowing those blocks to be read, another words, denying read requests for blocks of data whose flag/indicator is not set and allowing read requests for blocks of data that have set flags/indicators. In an embodiment, the determination to have set or not set flags as indicating whether to deny a read requests can be based at least in part on how much data is associated with each erase request.

Figure 7:
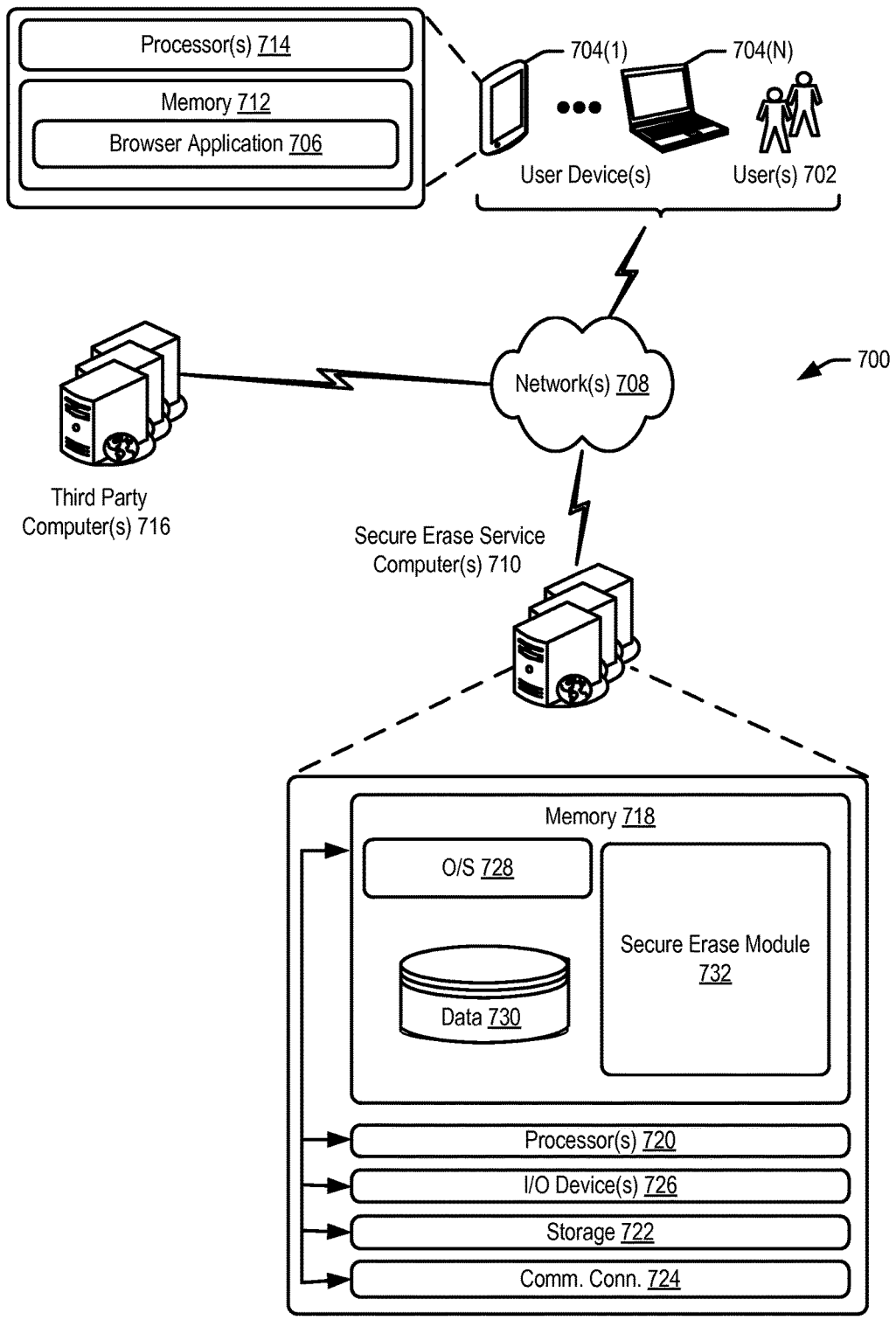
FIG. 7 illustrates an example computer architecture for implementing a secure erase feature, according to embodiments.

FIG. 7 illustrates an example computer architecture for implementing a secure erase feature, according to embodiments. In architecture 700, one or more users 702 (e.g., users) may utilize user computing devices 704(1)-(N) (collectively, user devices 704) to access a browser application 706 (e.g., a network document browser) or a user interface (UI) accessible through the browser application 706, via one or more networks 708 to submit data access requests for data stored on a flash media storage device. The "browser application" 706 can be any browser control or native application that can access and display a web page or other information. In some aspects, the browser application 706 may display information indicating the status of a data access request including a notification that no data is written to portions of the flash media storage device in response to a previously executed erase data request.

The architecture 700 may also include, one or more secure erase service computers 710 that may, in some examples, provide computing resources such as, but not limited to, client entities, low latency data storage, durable data storage, data access, management, virtualization, hosted computing environment or "cloud-based" solutions, electronic content performance management, etc. The one or more secure erase service computers 710 may also be operable to provide site hosting, computer application development, and/or implementation platforms, combinations of the foregoing, or the like to the one or more users 702.

In one illustrative configuration, the user computing devices 704 may include at least one memory 712 and one or more processing units or processor(s) 714. The processor(s) 714 may be implemented as appropriate in hardware, computer-executable instructions, firmware, or combinations thereof. Computer-executable instruction or firmware implementations of the processor(s) 714 may include computer-executable or machine-executable instructions written in any suitable programming language to perform the various functions described herein. The user devices 704 may also include geo-location devices (e.g., a global positioning system (GPS) device or the like) for providing and/or recording geographic location information associated with the user devices 704. The memory 712 may store program instructions that are loadable and executable on the processor(s) 714, as well as data generated during the execution of these programs. Depending on the configuration and type of user device 704, the memory 712 may be volatile (such as random access memory (RAM)) and/or non-volatile (such as read-only memory (ROM), flash memory, etc.). The user device 704 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 712 may include multiple different types of memory, such as static random access memory (SRAM), dynamic random access memory (DRAM), or ROM.

Turning to the components of the memory 712 in more detail, the memory 712 may include an operating system and one or more application programs or services for implementing the features disclosed herein including providing a firmware update for flash media storage devices and communicating data access requests for data storage devices in communication with the secure erase service computers 710. An indication or notification in response to the data access requests can be provided for presentation to the user 702 via the browser application 706, dedicated applications (e.g., smart phone applications, tablet applications, etc.), or through capabilities inherit to a device (e.g., user interfaces or touch input interfaces). Additionally, the memory 712 may store access credentials and/or other user information such as, but not limited to, user IDs, passwords, and/or other user information. In some examples, the user information may include information for authenticating an account such as, but not limited to, a device ID, a cookie, an IP address, a location, or the like. In addition, the user information may include a user 702 provided response to a security question or a geographic location obtained by the user device 704.

In some examples, the networks 708 may include any one or a combination of many different types of networks, such as cable networks, the Internet, wireless networks, cellular networks and other private and/or public networks. While the illustrated example represents the users 702 communicating with secure erase service computers 710 over the networks 708, the described techniques may equally apply in instances where the users 702 interact with the one or more secure erase service computers 710 via the one or more user devices 704 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The browser application 706 may be capable of handling requests from many users 702 and serving, in response, various user interfaces that can be rendered at the user devices 704 such as, but not limited to, a network site or web page. The browser application 706 can interact with any type of network site that supports user interaction, including social networking sites, electronic retailers, informational sites, blog sites, search engine sites, news and entertainment sites, electronic marketplaces, and so forth. The described techniques can similarly be implemented outside of the browser application 706, such as with other applications running on the user device 704. In some examples, the one or more secure erase service computers 710 may communicate with one or more third party computers 716 to provide secure erase functionality for devices hosted or associated with the one or more third party computers 716.

The one or more secure erase service computers 710 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more secure erase service computers 710 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more secure erase service computers 710 may be in communication with the user device 704 via the networks 708, or via other network connections. The one or more secure erase service computers 710 may include one or more servers, perhaps arranged in a cluster or as individual servers not associated with one another.

In one illustrative configuration, the one or more secure erase service computers 710 may include at least one memory 718 and one or more processing units or processors(s) 720. The processor(s) 720 may be implemented as appropriate in hardware, computer-executable instructions, firmware, or combinations thereof. Computer-executable instruction or firmware implementations of the processor(s) 720 may include computer-executable or machine-executable instructions written in any suitable programming language to perform the various functions described when executed by a hardware computing device, such as a processor. The memory 718 may store program instructions that are loadable and executable on the processor(s) 720, as well as data generated during the execution of these programs. Depending on the configuration and type of the one or more secure erase service computers 710, the memory 718 may be volatile (such as RAM) and/or non-volatile (such as ROM, flash memory, etc.). The one or more secure erase service computers 710 or servers may also include additional storage 722, which may include removable storage and/or non-removable storage. The additional storage 722 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 718 may include multiple different types of memory, such as SRAM, DRAM, or ROM.

The memory 718, the additional storage 722, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 718 and the additional storage 722 are all examples of non-transitory computer storage media. Additional types of non-transitory computer storage media that may be present in the one or more secure erase service computers 710 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the one or more secure erase service computers 710. Combinations of any of the above should also be included within the scope of non-transitory computer-readable media.

The one or more secure erase service computers 710 may also contain communication connection interface(s) 724 that allow the one or more secure erase service computers 710 to communicate with a data store, another computing device or server, user terminals and/or other devices on the networks 708. The one or more secure erase service computers 710 may also include I/O device(s) 726, such as a keyboard, a mouse, a pen, a voice input device, a touch input device, a display, speakers, a printer, etc.

Turning to the contents of the memory 718 in more detail and as was described above in further detail in FIG. 4, the memory 718 may include an operating system 728, one or more data stores 730, and/or one or more application programs or services for implementing the features disclosed herein including an secure erase module 732 (which may be an example of secure erase module 400). In accordance with at least one embodiment, the secure erase module 732 may be configured to at least process, via a first layer of firmware, a data access request by verifying the first layer of firmware via a second layer of firmware for a flash media storage device, set a flag or update an indicator for a portion of the storage area of the flash media storage device in response to a verified erase request, and indicate to a requesting entity that no data is written to particular portions of the storage area of the flash media storage device in response to subsequent read requests upon execution of the verified erase request, the indication based at least in part on identifying, by the second layer of firmware, that the flags or indicators are modified to indicate that no data is written for data blocks that correspond to the executed erase request until new data is written to such portions and the flags/indicators are further modified to reflect a verified write request to the same data blocks.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions indicator to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for securely erasing data, comprising:
   receiving, via a first layer of firmware on a solid state storage device, an erase request for the data stored on the solid state storage device, the first layer of firmware being accessible by a user device to process data access requests;
   verifying, by a second layer of firmware on the solid state storage device, the first layer of firmware on the solid state storage device based at least in part on a comparison between a first hash value associated with the first layer of firmware and a second hash value associated with the second layer of firmware, the second layer of firmware being inaccessible by the user device;
   updating, by the second layer of firmware, a flag for physical blocks of the solid state storage device based at least in part on the erase request, a state of the flag being maintained in the second layer of firmware;
   receiving a read request for a particular physical block of the physical blocks of the solid state storage device;
   denying, by the second layer of firmware, the received read request for the particular physical block of the physical blocks of the solid state storage device based at least in part on the updated flag for the particular physical block corresponding to the read request; and
   providing, by the second layer of firmware, an indication that no data is written to the solid state storage device in response to the read request for the data stored on the solid state storage device.

2. The computer-implemented method of claim 1, wherein in response to the erase request for the data stored on the solid state storage device all flags for the physical blocks of the solid state storage device are set.

3. The computer-implemented method of claim 1, wherein the erase request is transmitted by a service, over a network, to a computer system operatively connected to the solid state storage device, the service providing a user interface for a user to initiate the erase request.

4. The computer-implemented method of claim 1, wherein the solid state storage device includes non-magnetic storage media that utilizes write leveling to prevent direct access to data storage locations.

5. A storage device comprising:
   a first layer of firmware executed by at least one of one or more processors, the first layer of firmware configured to receive access requests for data stored on the storage device; and
   a second layer of firmware executed by at least one of the one or more processors, the second layer of firmware being inaccessible by user devices and configured to:
      receive, from the first layer of firmware, a request to erase a portion of the data stored on the storage device;
      update an indicator associated with the portion of the data that corresponds to the erase request;
      maintain a state of the indicator; and
      deny subsequent read requests, from the first layer of firmware, for one or more data blocks of the storage device that correspond to the portion of the data indicated by the erase request based at least in part on the state of the updated indicator associated with the portion of the data.

6. The system of claim 5, wherein the storage device further comprises an epoxy layer that encases the storage device, wherein the epoxy layer is configured to destroy components of the storage device when being removed from the storage device.

7. The system of claim 5, wherein the second layer of firmware is further configured to, in response to a write data request, append null data to second data included in the write data request based at least in part on the size of the second data and the one or more data blocks of the storage device utilized to fulfill the write data request.

8. The system of claim 5, wherein blocking the subsequent read requests is based at least in part on the second layer of firmware modifying the indicator associated with the one or more data blocks of the storage device.

9. The system of claim 5, wherein the first layer of firmware is further configured to generate an encryption key based at least in part on hardware characteristics of a computer system that is connected to the storage device.

10. The system of claim 5, wherein the storage device further comprises an independent power source.

11. The system of claim 10, wherein the second layer of firmware is further configured to block the subsequent read requests, from the first layer of firmware, based at least in part on a signal received from the independent power source, the signal indicating that the storage device has been removed from an associated computer system.

12. The system of claim 5, wherein the second layer of firmware is further configured to maintain information indicating portions of data blocks of the storage device that are available for read requests that are associated with the one or more data blocks that are blocked from being read.

13. A non-transitory computer-readable storage medium storing computer-executable instructions that, when executed by a computer system, cause the computer system to perform operations comprising:
   in response to an erase data request received via a first layer of firmware of the computer-readable storage medium, update, by a second layer of firmware of the computer-readable storage medium, a flag for one or more physical blocks of the computer-readable storage medium that correspond to the erase data request, wherein the second layer of firmware of the computer-readable storage medium is configured to deny subsequent read data requests for the one or more physical blocks by providing an indication that no data is currently written to the one or more physical blocks based at least in part on the updated flag for the one or more physical blocks, and to maintain a state of the flag; and in response to receiving an indication that a firmware update is being attempted for the first layer of firmware, update the flag for the one or more physical blocks that comprise the computer-readable storage medium thereby denying subsequent read data requests for the computer-readable storage medium.

14. The non-transitory computer readable medium of claim 13, wherein the instructions, when executed by the computer system, further cause the computer system to maintain location information associated with the computer-readable storage medium, wherein an updated version of the second layer of firmware is configured to update the flag for all physical blocks of the computer-readable storage medium based at least in part on the location information and a geo-fence associated with the computer-readable storage medium.

15. The non-transitory computer readable medium of claim 14, wherein in response to the erase data request, updating the flag for other physical blocks of the computer-readable storage medium that do not correspond to the erase data request.

16. The non-transitory computer readable medium of claim 13, wherein the instructions, when executed by the computer system, further cause the computer system to provide a notification that indicates that no data is written to the computer-readable storage medium in response to receiving the indication that the subsequent firmware update is being attempted.

17. The non-transitory computer readable medium of claim 13, wherein the instructions, when executed by the computer system, further cause the computer system to further update the flag that was previously updated for the one or more physical blocks that compromise the computer-readable storage medium in response to receiving a write data request for the computer-readable storage medium.

18. The non-transitory computer readable medium of claim 13, wherein updating the version of firmware of the computer-readable storage medium includes erasing the version of firmware that is configured to process the data access requests for the data stored on the computer-readable storage medium.

19. The non-transitory computer readable medium of claim 13, wherein the indication that a subsequent firmware update is being attempted includes receiving an application programming interface call from an operating system interacting with the computer-readable storage medium.

20. The non-transitory computer-readable medium of claim 13, wherein the instructions, when executed by the computer system, further cause the computer system to:
maintain a version of the first layer of firmware that is configured to process data access requests for data stored on the computer-readable storage medium; and
update the version of the first layer of firmware of the computer-readable storage medium.

* * * * *